US006767941B2

(12) United States Patent
Van Der Spek et al.

(10) Patent No.: US 6,767,941 B2
(45) Date of Patent: Jul. 27, 2004

(54) HALOGEN-FREE FLAME-RETARDANT COMPOSITION

(75) Inventors: Pieter A. Van Der Spek, Elsloo (NL);
Martinus L. M. Bos, Born (NL);
William A. C. Roovers, Sittard (NL);
Marnix Van Gurp, Sittard (NL);
Henrica N. A. M. Menting, Susteren (NL)

(73) Assignee: DSM IP Assets B.V., Heerlen (NL)

( * ) Notice: Subject to any disclaimer, the term of this patent is extended or adjusted under 35 U.S.C. 154(b) by 93 days.

(21) Appl. No.: 09/993,927

(22) Filed: Nov. 27, 2001

(65) Prior Publication Data

US 2002/0096669 A1 Jul. 25, 2002

Related U.S. Application Data

(63) Continuation of application No. PCT/NL00/00293, filed on May 8, 2000.

(30) Foreign Application Priority Data

May 28, 1999 (NL) .............................................. 1012176

(51) Int. Cl.$^7$ ......................... C08K 5/3492; C08K 5/49
(52) U.S. Cl. ....................... 524/100; 524/101; 524/126; 524/127; 524/128; 524/129; 524/130; 524/131; 524/132; 524/133; 524/135; 524/136; 524/140; 524/141; 524/145; 524/147; 524/151; 524/152; 524/153; 523/451; 523/461
(58) Field of Search .............................. 524/100–101, 524/126–133, 135–136, 140–141, 145, 147, 151–153, 494; 523/451, 461

(56) References Cited

U.S. PATENT DOCUMENTS

| | | | | |
|---|---|---|---|---|
| 4,246,378 A | * | 1/1981 | Kometani et al. .......... 525/438 |
| 4,284,540 A | * | 8/1981 | Iida et al. .................. 524/400 |
| 4,456,719 A | * | 6/1984 | Yamamoto et al. ......... 524/114 |
| 4,866,114 A | * | 9/1989 | Taubitz et al. .............. 524/100 |
| 4,962,148 A | * | 10/1990 | Orikasa et al. ............. 524/504 |
| 5,017,650 A | * | 5/1991 | Nakamura et al. ............ 525/65 |
| 5,091,478 A | * | 2/1992 | Saltman ...................... 525/179 |
| 5,380,774 A | * | 1/1995 | Mulholland ................. 524/182 |
| 5,424,104 A | * | 6/1995 | Amimoto et al. .......... 428/36.8 |
| 5,710,212 A | * | 1/1998 | Asano et al. ................. 525/63 |
| 5,846,478 A | * | 12/1998 | Onishi et al. ............... 264/523 |
| 5,889,114 A | * | 3/1999 | Statz .......................... 525/166 |
| 6,020,414 A | * | 2/2000 | Nelsen et al. ............... 524/424 |
| 6,043,306 A | * | 3/2000 | Imahashi ..................... 524/436 |
| 6,174,943 B1 | * | 1/2001 | Matsumoto et al. ........ 524/115 |
| 6,469,095 B1 | * | 10/2002 | Gareiss et al. .............. 524/504 |
| 6,476,158 B1 | * | 11/2002 | England et al. ............. 525/466 |
| 6,538,054 B1 | * | 3/2003 | Klatt et al. .................. 524/101 |
| 2001/0012557 A1 | * | 8/2001 | Willham et al. ............. 428/215 |
| 2003/0008141 A1 | * | 1/2003 | Philippoz et al. ........... 428/357 |

FOREIGN PATENT DOCUMENTS

| | | | |
|---|---|---|---|
| DE | 0 196 53 042 | * | 6/1998 |
| EP | 0006568 | | 1/1980 |
| EP | 0472064 | | 2/1992 |
| EP | 0829517 | | 3/1998 |
| WO | 9817720 | | 4/1998 |
| WO | 9823684 | | 6/1998 |
| WO | 9900456 | | 1/1999 |
| WO | 9902606 | | 1/1999 |

* cited by examiner

*Primary Examiner*—Peter Szekely
(74) *Attorney, Agent, or Firm*—Pillsbury Winthrop LLP

(57) ABSTRACT

A halogen-free, flame-retardant composition includes (1) organic phosphorus compound (A) and (1') melamine or a compound derived from melamine (B); or (2) a melamine-phosphorus compound (AB). The composition also includes and olefin polymer and from 0.1–30 wt % based on the olefin polymer, of a compound containing acid, acid anhydride or epoxy groups. The flame-retardant composition may included in a polycondensate composition which incorporate the flame-retardant composition is substantially shortened.

8 Claims, No Drawings

HALOGEN-FREE FLAME-RETARDANT COMPOSITION

This is a Continuation of International Application No. PCT/NL00/00293 filed May 8, 2000, which designated the U.S. and was published in English. The contents of this PCT application are incorporated in their entirety by reference.

The invention relates to a halogen-free, flame-retardant composition comprising at least an organic phosphorus compound (A) and melamine or a compound derived from melamine (B), or a melamine-phosphorus compound (AB).

Such a composition is known from WO 99/02606, which describes polybutylene terephthalate (PBT) compositions that contain a halogen-free, flame-retardant composition consisting of resorcinol-bis-(diphenylphosphate) (RDP) or a trimethylolpropanol ester of methylphosphonic acid and melamine cyanurate or melam. Said publication also describes a polyamide-6 composition that contains a halogen-free, flame-retardant composition consisting of the trimethylolpropanol ester of methylphosphonic acid and melamine cyanurate or melam.

The drawback of the composition according to the state of the art is that the polycondensate compositions in which the flame-retardant composition can be used, in particular polyamide and polyester compositions containing glass fibres, have flame-retardant properties that do not yet meet the highest requirements. In particular the after-burning time is generally too long, in many cases even longer than 30 seconds, as a result of which no V-O classification according to the UL-94 test of the Underwriter Laboratories can be obtained. It is hence desirable to shorten the after-burning time, i.e. the time for which a composition burns after the removal of the flame. The polycondensate compositions in which the flame-retardant composition according to the invention is used can consequently for example obtain a better UL-94 classification, or a polycondensate composition with flame-retardant properties, similar to the ones disclosed in WO 99/02606, can be obtained using a smaller amount of flame-retardant composition.

The inventors have now surprisingly found that the after-burning time of a polycondensate composition that contains the flame-retardant components(A)+(B) or (AB) according to the state of the art can be shortened if the flame-retardant composition also contains a polymer (C) comprising at least one type of olefine having 2–12 carbon atoms and 0.1–30 wt. % (relative to the weight of the polymer) of at least one comonomer containing acid, acid anhydride or epoxy groups.

Another part of the invention is a polycondensate composition containing the flame-retardant composition according to the invention. An additional advantage of the polycondensate composition according to the invention is that the mechanical properties of the polycondensate composition according to the invention are not or not significantly lower than those of the polycondensate compositions according to the state of the art that do not contain component (C).

As component (C), the flame-retardant composition according to the invention contains a polymer comprising at least one olefine having 2–12 carbon atoms and 0.1–30 wt. % (relative to the weight of the polymer) of at least one comonomer containing acid, acid hydride or epoxy groups. Suitable polymers are for example ethylene, propylene or ethylene-propylene copolymers containing 0.1–30 wt. % (relative to the weight of the copolymer) of a comonomer containing acid, acid anhydride or epoxy groups. Said polymers may also contain comonomers that do not contain the aforementioned groups, for example acrylic esters or vinyl acetate. Preferably the polymer contains 0.5–12 wt. % (relative to the weight of the polymer) of a comonomer containing acid, acid anhydride or epoxy groups. Examples of such comonomers are acrylic acid, methacrylic acid, maleic anhydride, glycidyl acrylate and glycidyl methacrylate.

In a preferred embodiment the polymer is a polymer having a general chemical composition based on E, X and Y, with E standing for an ethylene radical, X standing for a radical formed from the compound

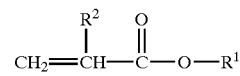

where $R^1$=alkyl radical having 1–8 carbon atoms $R^2$=H, $CH_3$ or $C_2H_5$ and Y a radical formed from glycidyl (alkyl) acrylate; for example glycidyl (meth)acrylate. Preferably the polymer based on E, X and Y contains 40–90 wt. % E, 1–40 wt. % X and 0.5–20 wt. % Y, the sum of the amounts being equal to 100 wt. %.

The use of polymer having a chemical composition based on E, X and Y in concentrations of 1–20 wt. % in halogen-containing flame-retardant polyester compositions is known from EP-B1-174,343 (DuPont) for increasing the ductility of said polyester compositions, especially at low temperatures.

The polymer component(C) is commercially available, for example as an ethylene/acrylic ester/glycidyl methacrylate terpolymer (Lotader® AX, Elf Atochem), ethylene/glycidyl methacrylate (Bondfast®, E with a mol. weight $M_n$=120,000, Sumitomo), ethylene/methacrylic acid (Nucrel®, Dupont), propylene/maleic anhydride (Himont), propylene/acrylic acid (Polybond®, BP Chemical) and ethylene/alfa-olefine copolymer modified with maleic anhydride (Tafmer®, Mitsui). Preferably, an ethylene/acrylic ester/glycidyl methacrylate terpolymer is chosen, more preferably an ethylene/methylmethacrylic ester/glycidyl methacrylate terpolymer (Lotader® AX 8900, Elf Atochem, with a molar weight ($M_n$) of approximately 90,000).

In polyester compositions good results were obtained with an ethylene/methylmethacrylic ester/glycidyl methacrylate terpolymer (Lotader® AX 8900). In polyamide compositions good results were obtained with an ethylene-propylene copolymer, modified with 0.5 wt. % maleic anhydride (Tafmer®, Mitsui).

Suitable organic phosphorus compounds (component A) are for example organic phosphates, phosphites, phosphonates, phosphinates and phosphine oxides. Preferably, phosphates, phosphonates or phosphinates are chosen. Examples of such phosphorus compounds are described in for example the "Encyclopedia of Chemical Technology", Vol. 10, p. 396 ff. (1980). Many are commercially available, for example resorcinol-bis (diphenylphosphate) oligomer, under the trade name Fyrolflex® RDP from AKZO-Nobel, NL; cresyl-diphenylphosphate (CDP) under the trade name Kronitex® CDP from FMC, UK; trimethylolpropanol ester of methylphosphonic acid, under the trade name Antiblaze® 1045 from Albright & Wilson, USA; polypentaerythritol phosphonate under the trade name Cyagard® RF 1041 from American Cyanamid, USA; Hostaflam® OP 910, a mixture of cyclic di- and triphosphonates from Clariant, Germany.

Preferably, a phosphorus compound with a low volatility is chosen as component (A).

Suitable for use as the compound derived from melamine (component B) are for example melamine derivatives, melamine condensation products or mixtures thereof. In the context of this application a "melamine derivative" is understood to be melamine with one or more amine groups having been substituted with one or more alkyl, aryl, aralkyl or cycloalkyl groups, for example to be chosen from the group comprising methyl, ethyl, ethenyl, phenyl or toluyl. Examples of such melamine derivatives are N,N',N''-triphenylmelamine. Another example of a melamine derivative is melamine cyanurate. In the context of this application a "melamine condensation product" is understood to be a compound in which two or more melamine compounds are connected to one another, for example melam, melem, melon and higher oligomers and menthone, which can for example be obtained using the process described in WO 96/16948.

Preferably, melamine, melamine cyanurate, melamine phosphate, melam, melem or mixtures thereof are chosen as component(B).

Suitable for use as the melamine-phosphorus compound (AB) are compounds like melamine phosphates, for example melamine pyrophosphate and melamine polyphosphate.

The flame-retardant composition according to the invention is used in polycondensate compositions in concentrations between 1 and 50% (relative to the total weight of the polycondensate composition), preferably between 10 and 40%. The concentration can in principle be determined experimentally by a person skilled in the art. The ratio of components (A), (B), (AB) and (C) may also vary within a wide range. The concentration of organic phosphorus compound (component A) may vary within a wide range, for example between 0.5 and 20 wt. % (relative to the total weight of the polycondensate composition), preferably between 1 and 15 wt. %. The concentration of melamine or compound derived therefrom (component B) may vary within a wide range, for example between 2 and 25 wt. % (relative to the total weight of the polycondensate composition), preferably between 3 and 20 wt. %, most preferably between 4 and 16 wt. %. The concentration of the polymer compound (component C) may vary within a wide range, preferably between 1 and 20 wt. %, more preferably between 1 and 10 wt. % (relative to the total weight of the polycondensate composition). A person skilled in the art will be able to determine the optimum composition in his case through systematic research.

The composition according to the invention can be used as a flame-retardant system in all polycondensate compositions known to a person skilled in the art. Preferably, the composition is used in polyester and polyamide compositions.

Examples of suitable polyesters are polyalkylene terephthalates or copolyesters thereof with isophthalic acid, for example polyethylene terephthalate (PET), polybutylene terephthalate (PBT), polyalkylene naphthalates, for example polyethylene naphthalate (PEN), polypropylene naphthalate (PPN), polyphenylene terphtalate (PPT) and polybutylene naphthalate (PBN), polyalkylene dibenzoates, for example polyethylene dibenzoate and copolyesters of the aforementioned polyesters. Preferably, PET, PBT, PEN, PPT or PBN is chosen. Also suitable are block copolyesters which, in addition to hard polyester segments chosen from the aforementioned group, also contain soft polyester segments derived from at least a polyether or an aliphatic polyester. Examples of such block copolyesters with elastomeric properties are for example described in the "Encyclopedia of Polymer Science and Engineering", Vol. 12, p. 75 ff. (1988), John Wiley & Sons, and in "Thermoplastic Elastomers", 2nd Ed., Chapter 8 (1996), Hanser Verlag, the relevant contents of which is regarded as mentioned here. Furthermore, also polyester blends are suitable, such as PET/PBT, PBT/polycarbonate or PBT/rubber blends.

Examples of suitable polyamides are the aliphatic polyamides PA-6, PA-6,6, PA-9, PA-11, PA-4,6 and copolyamides thereof and semi-aromatic polyamides based on for example PA-6 or PA-6,6 and aromatic dicarboxylic acids and aliphatic diamines, for example isophthalic acid and terephthalic acid and hexanediamine, for example PA-6/6.T, PA-6, 6/6,T, PA-6,6/6/6,T and PA-6,6/6,I/6,T. Preferably PA-6, PA-6,6 and PA-4,6 are chosen. Furthermore, also polyamide blends are suitable.

The composition according to the invention can also be used in polycondensate compositions that contain other additives known to a person skilled in the art that are usually used in polycondensate compositions, without them essentially detracting anything from the invention, in particular pigments, processing aids, for example mould release agents, crystallisation accelerators, nucleating agents, softeners, UV and heat stabilisers, antioxidants and the like. Other substances that promote the flame-retardancy can optionally be added, too, for example carbon-forming substances such as polyphenylene ether and polycarbonate and substances that affect the dripping behaviour, for example fluoropolymers such as polytetrafluoroethylene.

In particular the polycondensate composition contains an inorganic filler or reinforcing agent. Suitable inorganic fillers or reinforcing agents are all the fillers known to a person skilled in the art, for example glass fibres, metal fibres, graphite fibres, aramide fibres, glass beads, aluminium silicates, asbestos, mica, clay, calcined clay and talk. Preferably, glass fibres are chosen.

The polycondensate composition according to the invention can be obtained in a simple manner for example by means of melt-mixing. Preferably use is then made of an extruder fitted with means for dosing all the desired components to the extruder, either in the extruder's throat, or to the melt.

The invention will be further elucidated with reference to the following examples and comparative examples.

EXAMPLES

Examples I and II and Comparative Examples A and B

A number of polyester compositions were prepared using the following components in varying concentrations:

Polycondensate: polybutylene terephthalate (PBT): Arnite® PBT from DSM Engineering Plastics, the Netherlands.

Component A: Antiblaze® 1045 from Albright & Wilson, USA.

Component B: melamine cyanurate: Melapur® MC50 from DSM Melapur, the Netherlands.

Component C: Lotader® AX8900 from Elf Atochem, France. This component is a terpolymer of ethylene, methylmethylene acrylate (MMA, 24 weight %) and glycidyl methacrylate (GMA, 8 weight %) with a molecular weight $M_n$=90,000.

Other additives:
  glass fibre: length 4–4.5 mm and diameter 10–14 $\mu$m
  release agent.

The compositions were prepared using a ZSK 30 twin-screw extruder.

The compositions were used to injection-mould specimens. They were subjected to the following tests:

flame retardancy according to UL94 at 1.6 mm after 48 hours at 23° C./50% relative humidity (RH);
determination of modulus of elasticity according to ISO 527-1;
determination of tensile stress at break according to ISO 527-1.

The results are summarised in Table 1.

TABLE 1

Halogen-free polyester compositions.
All the amounts are percents by weight, relative to the composition's total weight.

| Example | | A | I | B | II |
|---|---|---|---|---|---|
| Polyester | % | 54.75 | 51.75 | 45 | 42 |
| Component A | % | 10 | 10 | 10 | 10 |
| Component B | % | 15 | 15 | 15 | 15 |
| Component C | % | — | 3 | — | 3 |
| Other additives | | | | | |
| glass fibre | % | 20 | 20 | 30 | 30 |
| release agent | % | 0.25 | 0.25 | — | — |
| Flame retardancy UL94 at 1.6 mm after 48 hours at 23° C./ 50% RH | | NC | V-0 | V-1 | V-0 |
| 1st application of flame | | | | | |
| average after-burning time | sec | 17.6 | 2.4 | 2.4 | 1.4 |
| average time to dripping | sec | 0 | 0 | 0 | 0 |
| 2nd application of flame | | | | | |
| average after-burning time | sec | 19 | 2.2 | 11.6 | 1.0 |
| average time to dripping | sec | 26 | 0 | 0 | 0 |
| Modulus of elasticity | MPa | 6621 | 6466 | 9386 | 9123 |
| Tensile stress at break | % | 87 | 86 | 75 | 74 |

NC = no classification
V-0, V-1 and V-2 classifications according to UL-94
"average time to dripping" = the time from the application of the flame to the falling of the first drop.

From Table 1 it can be inferred that:
the addition of component (C) to the composition according to the state of the art leads to a drastic shortening of the after-burning time, such that a V-O classification is obtained.
the modulus of elasticity and the tensile stress at break are not essentially affected by the addition of component (C).

The flame retardancy of compositions I and A was also determined after 168 hours' conditioning at 70° C. The results are summarised in Table 2. A drastic shortening of the after-burning time was obtained under these conditions, too.

TABLE 2

Halogen-free polyester compositions

| Example | Unit | A | I |
|---|---|---|---|
| Flame retardancy UL94 at 1.6 mm after 168 hours at 70° C. | | NC | V-1 |
| 1st application of flame | | | |
| average after-burning time | sec | 30.8 | 4.4 |
| average time to dripping | sec | 40 | 0 |
| 2nd application of flame | | | |
| average after-burning time | sec | 28 | 12.0 |
| average time to dripping | sec | 9.0 | 0 |

Examples III–VI and Comparative Examples C–F

A number of polyester compositions were prepared using the following components in varying concentrations:

Polycondensate: polybutylene terephthalate (PBT): Arnite® PBT from DSM Engineering Plastics, the Netherlands.

Component A: AB : Antiblaze® 1045 from Albright & Wilson, USA. NH : NH-1197 from Great Lakes, USA (cyclic ester of pentaerythritol and phosphoric acid.

Component B: a mixture of melamine (2.5 weight %), melam (0.4 weight %), melem (79.1 weight %) and higher melamine homologues (18 weight %), obtained from DSM Melapur, the Netherlands.

Component C: Lotader® AX8900 from Elf Atochem, France. This component is a terpolymer of ethylene, methylmethylene acrylate (MMA, 24 weight %) and glycidyl methacrylate (GMA, 8 weight %) with a molecular weight $M_n$=90,000.

Other additives:
glass fibre: length 4–4.5 mm and diameter 10–14 $\mu$m.
The compositions were prepared using a ZSK 30 twin-screw extruder.
The compositions were used to injection-mould specimens. They were subjected to the following tests:

flame retardancy according to UL94 at 1.6 mm after 48 hours at 23° C./50% relative humidity (RH);

The results are summarised in Table 3. From these results it is apparent that the compositions comprising Component C have a shorter after-burning time than the compositions without Component C. Also, the amount of Component B can be lowered in the presence of Component C without imparting the after-burning time of the composition.

TABLE 3

Halogen-free polyester compositions. All the amounts are percents by weight, relative to the composition's total weight.

| Example | | C | III | D | IV | E | V | F | VI |
|---|---|---|---|---|---|---|---|---|---|
| Polyester | % | 45 | 42 | 48 | 45 | 45.6 | 43.6 | 45 | 42 |
| Component A | % | 10 | 10 | 7 | 7 | 6.4 | 6.4 | AB:4 NH:4 | AB:4 NH:4 |
| Component B | % | 15 | 15 | 15 | 15 | 18 | 18 | 17 | 17 |
| Component C | % | — | 3 | — | 3 | — | 2 | — | 3 |
| Other additives glass fibre | % | 30 | 30 | 30 | 30 | 30 | 30 | 30 | 30 |
| 1st application of flame av. after-burning time | Sec | 1 | 1 | 10.6 | 2.0 | 10.6 | 3.0 | 1.0 | 2.0 |
| 2nd application of flame av. after-burning time | Sec | 1 | 1 | 6.8 | 1.0 | 2.8 | 1.0 | 3.0 | 2.0 |

Example VII and Comparative Example G

Polyamide compositions were prepared using the following components in varying concentrations:

Polycondensate: polyamide-6: Akulon® PA-6 from DSM Engineering Plastics, the Netherlands;

Component A: P compound: Antiblaze® 1045 from Albright & Wilson, USA;

Component B: melamine cyanurate: Melapur® MC50 from DSM Melapur, the Netherlands;

Component C: Tafmer® MP0610 from Mitsui, Japan

Other additives:
glass fibre: length 4–4.5 mm, diameter 10–14 μm.
The compositions were prepared using a ZSK 30 twin-screw extruder.

TABLE 3

Halogen-free polyamide compositions

| Example | Unit | G | VII |
|---|---|---|---|
| Polyamide-6 | % | 45.00 | 43 |
| Component A | % | 10 | 10 |
| Component B | % | 15 | 15 |
| Component C | % | — | 2 |
| Other additives | | | |
| glass fibre | % | 30 | 30 |
| Flame retardancy UL94 at 1.6 mm after 48 h at 23° C./50% RH | | V-2 | V-0 |
| 1st application of flame | | | |
| after-burning time | sec | 1.0 | 1.0 |
| time to dripping | sec | 0 | 0 |
| 2nd application of flame | | | |
| after-burning time | sec | 13.0 | 4.6 |
| time to dripping | sec | 21.8 | 0 |
| modulus of elasticity | MPa | 10359 | 10079 |
| tensile stress at break | % | 154.7 | 141.9 |

What is claimed is:

1. Halogen-free, flame-retardant composition consisting of either (1) or (1') below:
   (1) an organic phosphorus compound (A), and melamine or a melamine condensation product (B), or
   (1') a melamine-phosphorus compound (AB), and
   (2) a polymer (C) comprising at least one type of olefine having 2–12 carbon atoms and 0.1–30 weight % relative to the weight of the polymer (C) of at least one comonomer containing epoxy groups.

2. Composition according to claim 1, wherein the component (C) is a polymer obtained by copolymerizing E, X and Y compounds, wherein E is ethylene, X is a compound having the formula.

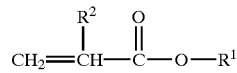

where $R^1$=alkyl radical having 1–8 carbon atoms $R^2$=H, $CH_3$ or $C_2H_5$ and Y is glycidyl (alkyl)acrylate.

3. Composition according to claim 1, wherein said component (C) is an ethylene/acrylic ester/glycidyl methacrylate terpolymer.

4. Composition according to claim 3, wherein said component (C) is an ethylene/methylacrylate ester/glycidyl methacrylate terpolymer.

5. Composition according to claim 1, wherein the organic phosphorus component(A) or the melamine-phosphorus compound (AB) is a phosphate, a phosphinate or a phosphonate.

6. Polyester or polyamide flame retardant composition free of halogen comprising either (1) or (1'), below:
   (1) an organic phosphorous compound (A) and melamine or a melamine condensation product (B);
   (1') a melamine-phosphorous compound (AB); and further comprising
   (2) a polymer (C) comprising at least one type of olefin monomer having 2–12 carbon atoms and 0.1–30 weight % relative to the weight of the polymer (C) of at least one comonomer containing epoxy groups;
   (3) a polyester or polyamide; and
   (4) glass fiber.

7. Flame retardant composition according to claim 6, wherein (3) is a polyester selected from the group consisting of polyethylene terephthalate), polybutylene terephthalate, polyethylene naphthalate, polyphenylene terephthalate, and polybutylene naphthalate.

8. Flame retardant composition according to claim 6, wherein (3) is a polyester selected from the group consisting of polyamide-6, polyamide-6,6 and polyamide-4,6.

* * * * *